United States Patent [19]
Sudoh et al.

[11] 3,885,109
[45] May 20, 1975

[54] RELAY TELEPHONE DIAL PULSE REGISTER

[75] Inventors: Kengo Sudoh, Kawasaki; Fumio Tsutsumi, Yokohama, both of Japan

[73] Assignees: Nippon Tsu Shin Kogyo K.K., Kanagawa, Japan; TIE/Communications, Inc., Stamford, Conn. ; part interest to each

[22] Filed: Mar. 23, 1973

[21] Appl. No.: 344,199

[30] Foreign Application Priority Data

Jan. 13, 1973 Japan ................................ 48-12511

[52] U.S. Cl. ................. 179/99; 179/18 EB; 179/37
[51] Int. Cl. ............................................ H04m 1/26
[58] Field of Search... 179/99, 18 AD, 84 SS, 1 CN, 179/1 H, 18 EB, 37; 235/92 J, 92 TE

[56] References Cited

UNITED STATES PATENTS

| | | | |
|---|---|---|---|
| 2,869,034 | 1/1959 | Simkins | 235/92 TE |
| 3,243,515 | 3/1966 | Abbott | 179/18 EB |
| 3,431,365 | 3/1969 | Siegel et al. | 179/18 EB |
| 3,450,845 | 6/1969 | Morse | 179/84 SS |
| 3,582,562 | 6/1971 | Sellari | 179/99 |
| 3,609,249 | 9/1971 | Pinede | 179/99 |
| 3,626,106 | 12/1971 | Greening | 179/84 SS |
| 3,670,110 | 6/1972 | Warner | 179/18 AD |

*Primary Examiner*—Kathleen H. Claffy
*Assistant Examiner*—Gerald L. Brigance
*Attorney, Agent, or Firm*—Kenyon & Kenyon

[57] ABSTRACT

A dial pulse register circuit is disclosed in which relays are used to perform the impulse counting functions while transistor switching circuits and a silicon controlled rectifier circuit are used to control the operation of the counting relays.

3 Claims, 1 Drawing Figure

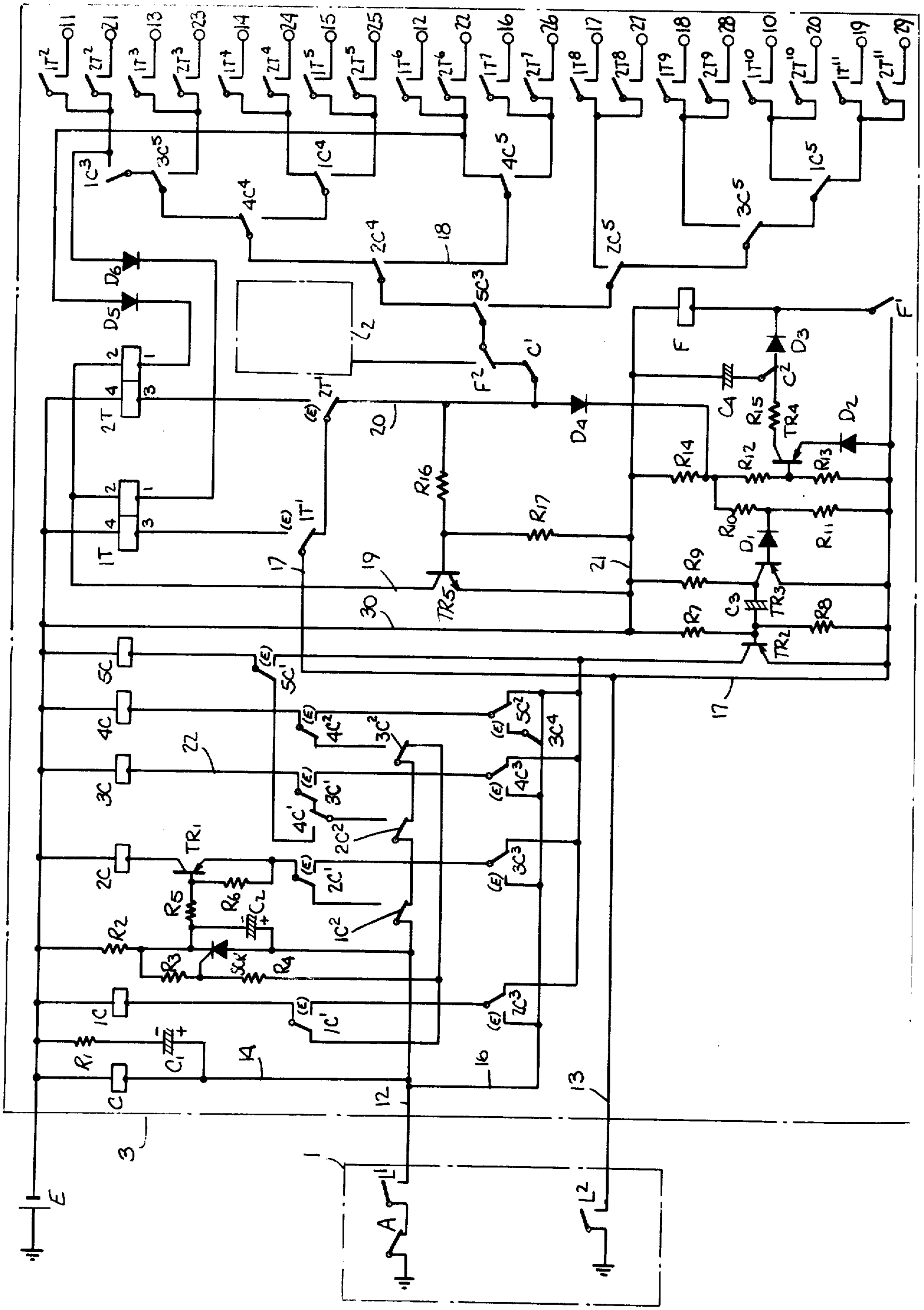

RELAY TELEPHONE DIAL PULSE REGISTER

BACKGROUND OF THE INVENTION

The present invention relates in general to a telephone dial pulse register circuit, and more particularly, to a relay register circuit for use in intercom signalling circuits of a key telephone system.

Relay register circuits are generally advantageous because the register output terminals are derived directly from the contacts of the register relays, resulting in a register output which is isolated from other circuit voltages and ground instead of being related to some reference voltage as in registers using semiconductors. Because of this advantage, relay registers continue to find wide application even in the present age of integrated circuits.

The present invention has for its object, therefore, an improved relay register circuit also using transistor circuits within the register to eliminate relays where the isolation is of no advantage. This object is accomplished by employing relays to perform impulse counting functions, but utilizing semiconductors in the control portion of the circuit not directly related to the register output.

BRIEF DESCRIPTION OF THE DRAWING

The present invention, as well as its objects and features, will be better understood by reference to the following detailed description of the preferred embodiment when considered together with the accompanying drawing illustrating a schematic circuit diagram of the preferred embodiment for carrying out this invention.

DETAILED DESCRIPTION OF THE PREFERRED EMBODIMENT

As shown in the drawing one of one or more intercom line circuits 1 is connected in parallel to the dial pulse register circuit 3 of the present invention.

In the drawing the contacts on the relays are shown in their unoperated positions. When the relays operate their contacts close to the position opposite that shown in the drawing. The letter "E" in parentheses (E) beside some of the make contacts denotes a make-before-break or early make contact, while beside a break contact it denotes a break-before-make or early break contact.

Talking relay A (not shown in the drawing) is connected to the intercom register circuit 3 through its contact A and is controlled by a key telephone (not shown in the drawing) connected to intercom circuit 1. When the hook switch and corresponding line key switch of the key telephone are closed, relay A operates, and if no other relays L (not shown), in the other line circuits (not shown), are operated, relay L (not shown) in the line circuit shown operates closing contacts $L^1$ and $L^2$. When the dial is operated at the key telephone set, it generates dial impulses. The dial impulses pulse relay A. Relay L is held operated while the dial impulses are repeated by relay A. 1C to 5C are counter relays in the register circuit. Each relay contact is labelled sequentially $1C^1$, $1C^2$, $1C^3$, etc., with the number before the letter corresponding to the particular counting relay and the number following the letter designating the number 1 contact, number 2 contact, etc., for relay 1C. This numbering convention applies to all the relays 1C through 5C as well as relays 1T and 2T. Relay C, a "C position relay" operates, and is held operated, when the first dial impulse is applied as an input to the register circuit by contact A. The relay C releases in response to a minimum, predetermined interdigital pause in the dial impulses at the end of the impulse train. In the drawing, C, without a prefaced number, designates its contact. Relays 1T and 2T, having contacts, 1T and 2T, are used to store the first digit of the two digit number dialed. Relay F, having contact F, operates when the dialing is completed. The output terminals on the drawing labelled 11, 21, etc., down through 19 and 29 are the register output terminals corresponding to the dial numbers of the key telephones connected to the register. When the counting in the register is completed, the register connects the called telephone through the appropriate register output terminal to the signal source circuit 2. The details of circuit 2 are omitted because they are irrelevant to an understanding of this invention.

To explain the operation of the register circuit of this invention the sequence of events within the circuit will be traced, assuming one key telephone wishes to reach the key telephone connected to terminal No. 20 by dialing that number. The calling party, by raising his handset, closes the hookswitch, operating relay A which, in turn, operates relay L. By the operation of relay L, a path is prepared to the register circuit through contacts $L^1$ and $L^2$ and leads 12 and 13. The preparation for the counting of the dial impulses is thus completed. When the calling party dials the first digit, 2, dial impulses are applied as inputs to the register circuit through contact A, (the contact on relay A) and the register counts the impulses. In this case, relay A releases twice thereby applying two ground pulses to lead 12.

As a result of the first release of relay A, closing contact A, ground is applied to both relays C and 1C. To relay C, current passes through contacts A and $L^2$ to lead 12, through the relay C winding on lead 14, and to the negative terminal of power source E. (The power sources are represented herein as batteries but are not intended to be limited thereto and other suitable power sources may be conveniently substituted.) The current also passes through capacitor C1 and resistor R1, in parallel with relay C, charging C1.

For relay 1C current passes through contacts a, $L^1$, $1C^2$, $2C^2$, $3C^2$, $1C^1$, relay 1C winding to the negative terminal of E.

The connections may be represented as:

```
ground--a--L¹-+-1C²--2C²--3C²--1C¹--relay coil 1C--battery
              |                                  |
              |---relay coil C--+-----------------'
              |                 |
              '---C1---R1-------'
```

(Circuit 1)

Thus both relays C and 1C operate, operating contacts C and 1C.

Simultaneously, current through circuit 1 is applied to silicon controlled rectifier SCR. This gates the SCR, turning it on by means of the circuit represented as:

```
                                   |-----------R3---------|
ground--a--L1--1C2--2C2--3C2--R4--SCR gate--SCR cathode--|--
               |                                          |
               |________________________________________C2--|

R2--battery
```

(Circuit 2)

so that current also then flows in the circuit:

ground--A--L¹--SCR anode--SCR cathode--R2---battery (Circuit 3)

at this point, because relay 1C operates contact 1C², the gate current is cut off. Because of the characteristics of an SCR, however, it continues to conduct through contacts A, L¹, R2 to battery.

The conduction of SCR and the operation of contact 1C², ground both the emitter and the base of transistor TR1, preventing relay 2C from operating during the first dial impulse. Capacitor C2 prevents SCR from being accidentally turned on when the circuit is energized. Thus, by the operation of the SCR circuit, the previously required 0C relay, connected ahead of relay 1C, is eliminated.

This will keep it operated, even after the ground to circuit 5, above, has been interrupted by the reoperation of relay A.

By the operation of relay 2C and its contact 2C3, the holding circuit for relay 1C is switched to the circuit:

ground---A---L¹---lead 16---2C³---1C¹---relay 1C coil---battery (Circuit 7)

Consequently, when relay A reoperates as mentioned, opening contact A, at the end of the second dial impulse, relay 1C releases, and because relay A remains operated more than the minimum interdigital time, relay C releases when capacitor C1 becomes discharged.

Relay 2C is held operated as described and when relay C is released, the first counting relay 2T operates through the circuit:

```
ground--L2--lead 13 and 17--1T1--2T1--C1--F2--5C3--2C4--lead 18-
                                     |
                                     |_________________________

4C5--D5--relay 2T winding 1-2--lead 19--TR5--battery
                                         |
------R16--------------------------------|
```

(Circuit 8)

Subsequently, the operation of relay A removes the ground applied to the register circuit through lead 12. Relay 1C is held through the following circuit connected through contact 1C¹, switched to lead 15:

ground---L²---lead 13---emitter-collector of TR2---2C³---1C¹---relay 1C coil---battery (Circuit 4)

(At this time transistor TR2 is on because of base current through battery E, $R_7$ and lead 30, while the emitter is grounded by lead 13.) Also, relay C is held operated between pulses by the long time constant of the combination of capacitor C1 and resistor R1 connected in parallel to and discharging into relay C. Finally, the operation of relay A, opening contact A, shuts SCR off.

When the next dial impulse releases relay A, because relay 1C is operated, the gating path to SCR through R4 is open (1C² being closed to the emitter of TR1) thus SCR does not conduct, consequently transistor TR1 turns on, operating relay 2C through the circuit:

ground---A---L¹---1C²---2C¹---emitter-collector of TR1---relay 2C coil---battery (Circuit 5)

Once relay 2C operates, its continued operation is maintained by the circuit:

ground---L²--emitter-collector of TR2---3C³---2C¹----emitter-collector of TR1---relay 2C coil---battery (Circuit 6)

Once relay 2T operates it is held operated until the call is completed through contact 2T¹ connected to ground through contact L² and lead 13 and 17. Furthermore, when contact 2T¹ operates, transistors TR3 and TR4 which were held in a cut-off state by the circuit:

ground---L²---leads 13 and 17---1T¹---2T¹---lead 20---D4---R14---lead 21---battery, (Circuit 9)

conduct because of the base current supplied to the transistors through resistors R14, R10 and R12. When transistor TR3 conducts, transistor TR2 is turned off while capacitor C3 discharges for a fixed period of time. The predetermined time interval of the turn off is determined by the time constant of resistor R7 and capacitor C3. Because the conduction of TR2 is used to hold the last operated relay 1C through 5C, operated during counting, relay 2C releases and transistor TR1 is cut off.

This completes the counting operation of the circuit for the first digit of the number 20. After the completion of the dialing of 2 relay 2T has been operated, and transistors TR3 and TR4 are conducting.

Counter relays 1T and 2T, as has been shown, are two-winding relays with operate and hold windings. Transistor TR5 is connected in a switching circuit to the operate windings because the register output contacts are used to transmit and receive other signals. Thus, after either counter relay 1T or 2T has operated, the operate windings of 1T and 2T are still connected to the register output, but if ground is sent to the register output contacts for another purpose the second counter relay is prevented from operating by the cut-off condition of transistor TR5. This permits the register output contact circuit to be used for two functions sequentially. Alternatively, if there is a surplus of contacts on the register relays, then counter relays 1T and 2T may have one winding and the transistor switching Circuit of TR5 may be eliminated.

Now, as the person dials the 0 of the number 20, relay A, in response to the dial impulses from the telephone, repeats the release-operate sequence ten times. In the same manner as for the first digit, as explained previously, on the first release, relay 1C operates; on the second release relay 2C operates; and on the second operation, relay 1C releases. When relay A releases the third time, since relay 2C is now operated, relay 3C operates by means of the circuit:

ground---A---$L^1$---lead 12---$1C^2$---$2C^2$---$4C^1$---$3C^1$---lead 22---relay 30 coil---battery, (Circuit 10)

and relay 3C is held operated by means of contact $3C^1$. On the other hand, relay 2C has its holding ground switched to the impulse output of the intercom circuit by contact $3C^3$ and consequently relay 2C releases upon the third operation of relay A.

In the same manner, by the fourth release of relay A, relay 4C operates through the circuit:

ground---A--$L^1$---lead 12---$1C^2$---$2C^2$---$3C^2$---$4C^2$---relay 4C coil---battery (Circuit 11)

and relay 3C releases when relay A operates the fourth time. After relay 3C releases, the register circuit operates for A's fifth and sixth releases in the same manner as during the first and second times A released, except that while relay 4C is held operated during this time, relay 1C operates again on the fifth release of A, relay 2C operates again on the sixth release of relay A, and relay 1C releases when relay A operates the sixth time.

When relay A releases the seventh time, since relays 2C and 4C are then operated, relay 5C operates through the circuit:

ground---A---$L^1$---lead 12---$1C^2$---$2C^2$---$4C^1$---$5C^1$---relay 5C coil---battery (Circuit 12)

and relay 5C is held operated through contact $5C^1$ and ground. On the other hand, because relay 4C, previously held operated, now has its hold ground switched over by contact $5C^2$ to the dial impulse input on line 12 of the register circuit 3, it releases when relay A operates for the seventh time. However, because at this time relay 3C is not operated, the hold ground for relay 2C continues after the seventh operation of relay A through the circuit:

ground---$L^2$---lead 13---TR2---$3C^3$---$2C^1$---TR1---relay 2C coil---battery (Circuit 13)

The register changes from this condition, (that is, relay 5C and relay 2C operated,) upon the eighth release of relay A, when relay 3C operates through the circuit:

ground--A--$L^1$--$1C^2$--$2C^2$--$4C^1$--$3C^1$--relay 3C coil--battery (Circuit 14)

Relay 3C is held operative by contact $3C^1$. At this time, relay 2C has its hold ground switched from $L^2$ to the dial impulse output $L^1$ of the intercom circuit by contact $3C^3$, and consequently releases when relay A operates the eighth time. When relay A releases a ninth time, relay 4C operates through Circuit 11 described above, and relay 4C is held by the circuit:

ground--$L^2$--lead 13--TR2--$3C^4$--$5C^2$--$4C^2$--relay 4C coil--battery (Circuit 15)

Relay 3C is released when relay A operates the ninth time, relay 4C has its hold ground switched by contact $3C^4$ and also releases. That is, after the ninth operation of relay A, only relay 5C is held operated. When relay A releases for the 10th time, Circuit 1 is reestablished, relay 1C again operates, and upon the 10th operation of A, the counting of the digit 0 dial impulses is finished. The relay operations of the counting circuit for 10 dial impulses may be summarized as shown in the following table:

Table 1

| Counting Relays: Relay A Released and Operated | 1C | 2C | 3C | 4C | 5C |
|---|---|---|---|---|---|
| First time | X | | | | |
| 2nd | | X | | | |
| 3rd | | | X | | |
| 4th | | | | X | |
| 5th | X | | | X | |
| 6th | | X | | X | |
| 7th | | X | | | X |
| 8th | | | X | | X |
| 9th | | | | | X |
| 10th | X | | | | X |

Note: "X" denotes that the relay operates.

When the sending of the dial impulses from the telephone set stops since relay A remains operated, relay C, held in operation up to this point, releases. While relay C was operated, a current path was completed:

ground--$L^2$--lead 13--D2--TR4--R15--$C^2$--capacitor C4--battery (Circuit 16)

This charged capacitor C4, so that when relay C releases, capacitor C4 is discharged through relay F by the circuit:

battery---C4---$C^2$---D3---relay F coil---battery (Circuit 17)

Relay F is operated by the discharge current and self-holds through contact $F^1$, and lead 13.

Further, as previously described, relay C was operated and held operated during the counting of the digit 2 dial impulses. It released when the counting for the digit 2 was completed, operated again and was held operated during the counting of the digit 0 dial impulses. However, while relay C operated during the counting of the digit 2, or first digit, transistor TR4 was cut off by a ground applied to its base through the circuit:

ground---$L^2$---$1t^1$---$2t^1$---D4

(Circuit 18)

Consequently, even with relay C operated, capacitor C4 was not charged during the counting of the digit 2. Transistor TR4 can be turned on only after the counting of the first digit impulses is finished and either relay 1T or 2T is operated. Consequently, by means of the operation of relay C and the conduction of TR4 during the counting of the second digit, when the counting of the second digit impulses is finished, capacitor C4 is charged, and relay F operates when relay C releases. When relay F operates, contact $F^2$ operates, in this example register output 20, the key telephone connected to register output 20 and the signal source circuit means 2 are connected.

This explains the operation of the register circuit for the dialing of the number 20 and the operation for other intercom numbers is similar. No detailed explanation will be given for each of these, except to tabulate, in Table 2, the operated relays at the completion of dialing for each intercom number.

Table 2

| Dial Number | Final Operating Relay | | Dial Number | Final Operating Relay | |
|---|---|---|---|---|---|
| 11 | 1C | 1T, F | 21 | 1C | 2T, F |
| 12 | 2C | " " | 22 | 2C | " " |
| 13 | 3C | " " | 23 | 3C | " " |
| 14 | 4C | " " | 24 | 4C | " " |
| 15 | 1C, 4C | " " | 25 | 1C, 4C | " " |
| 16 | 2C, 4C | " " | 26 | 2C, 4C | " " |
| 17 | 2C, 5C | " " | 27 | 2C, 5C | " " |
| 18 | 3C, 5C | " " | 28 | 3C, 5C | " " |
| 19 | 5C | " " | 29 | 5C | " " |
| 10 | 1C, 5C | " " | 20 | 1C, 5C | " " |

By means of the present invention, as explained in detail above, it is possible to transistorize the control portion of a register without losing the advantages of relay counting circuits, decimal counting being accomplished by five counting relays 1C to 5C, and the miniaturization of a relay register is thereby attained through reduction in the overall number of relays required.

It is to be understood that the embodiment of the invention described herein is merely intended to illustrate the operative principles of the invention and is not to be considered as limiting the scope of the invention. Modifications may be made by those skilled in the art without departing from the spirit of the invention.

What is claimed is:

1. In a relay operated telephone dial pulse register circuit having an input from a telephone line circuit and multiple output terminals, a C position relay, which operates, and is held operated, upon the application of the first dial impulse input to the register, and releases in response to a minimum predetermined interdigital pause in the dial impulses at the end of the impulse train, a plurality of counting relays, including a first and second counting relay with contacts to connect the register output terminals to the telephone line circuit, and a final connecting relay for connecting the register output terminal to the key telephone extension corresponding to the number dialled into the register, the register additionally comprising;

a first semiconductor control circuit means connected to the second counting relay for controlling the operation of the second counting relay to prevent the operation of the second counting relay during the occurrence of a pulse which operates the first counting relay, said pulse occurring in a pulse train dialed into the register and said control circuit means operating the second counting relay during a subsequent pulse of the pulse train corresponding to the dialed number;

a second semiconductor control circuit means connected to the counting relays for controlling the release of the counting relays upon the occurrence of a predetermined time interval in the pulse train of the dial impulses; and a third semiconductor control circuit connected to the final connecting relay for controlling the connection of the register output contact corresponding to the called key telephone extension to a signal source circuit means after completion of the pulse train of dial impulses produced by the dialing of the number.

2. In a telephone dial pulse register as in claim 1 wherein the register is used in the intercom signalling circuits of a key telephone system in which;

the first semiconductor control circuit means is comprised of a silicon controlled rectifier circuit means connected between the input to the counting relays and a negative terminal of a power supply, and a first transistor switching circuit means connected to drive the second counting relay, whereby during the gating and conduction of the silicon controlled rectifier circuit means upon the occurrence of the first input pulse to the circuit, the conduction in the rectifier circuit means thereby turns the first transistor circuit means off and prevents the operation of the second counting relay;

the second semiconductor control circuit means is comprised of a second transistor switching circuit means connected to at least one counting relay of the register, said second transistor switching circuit means holding the first counting relay during conduction; and the third semiconductor control circuit means is comprised of a third transistor switching circuit means connected to the C position relay and the final connecting relay, said control circuit upon release of the C position relay and the conduction of said third transistor switching circuit means controls the operation of the final connecting relay after the completion of the pulse train caused by the dialing of the number.

3. A relay telephone dial pulse register as in claim 2 further comprising;

a plurality of first digit storage relays connected to the counting relays;

a fourth transistor switching circuit means connected to at least one first digit storage relay to control the operation of the relay only in response to the completion of the dial impulse pulse train for the first digit of the dialed number.

* * * * *